United States Patent [19]

Nakagawa

[11] Patent Number: 5,595,424
[45] Date of Patent: Jan. 21, 1997

[54] MINI PLANE

[75] Inventor: Takao Nakagawa, Tokyo, Japan

[73] Assignee: S.T. Japan Inc., Tokyo, Japan

[21] Appl. No.: 386,525

[22] Filed: Feb. 6, 1995

[30] Foreign Application Priority Data

Apr. 27, 1994  [JP]  Japan .................................. 6-090110

[51] Int. Cl.$^6$ ...................................................... B26B 1/00
[52] U.S. Cl. ............................... 30/169; 30/280; 30/339; 15/236.01
[58] Field of Search .............................. 30/169, 136, 333, 30/330, 167, 329, 278, 280, 41, 54, 62, 64, 66, 90, 51, 29.5, 124, 281, 339; 15/236.01, 236.02, 237, 236.09

[56] References Cited

U.S. PATENT DOCUMENTS

| 725,480 | 4/1903 | Price | 30/332 |
|---|---|---|---|
| 918,967 | 4/1909 | Close | 30/169 |
| 979,911 | 12/1910 | Adams, Sr. | 30/169 |
| 1,687,403 | 10/1928 | Stafford | 30/280 |
| 2,350,157 | 5/1944 | Disse | 30/169 |
| 2,352,813 | 7/1944 | Testi | 30/64 |
| 2,367,571 | 1/1945 | Gaide | 30/64 |
| 4,704,795 | 11/1987 | Primich | 15/236.01 |

FOREIGN PATENT DOCUMENTS 1363488  8/1974  United Kingdom .................... 30/169

*Primary Examiner*—Eugenia Jones
*Assistant Examiner*—Charles Goodman
*Attorney, Agent, or Firm*—Fay, Sharpe, Beall, Fagan, Minnich & McKee

[57] ABSTRACT

A mini plane has a bar-like handle capable of being held in a hand like a pencil, a cutting blade holder fixed on the bar-like handle at a forward end thereof, and a cutting blade detachably attached to the cutting blade holder. The cutting blade has a flat seating face, a front face opposite the seating face, a slant blade face which is slanted at a lateral end portion of the front face, a positioning side face perpendicular to a cutting edge of the slant blade face, and a through hole which extends between the seating face and the front face for receiving a fixing screw. The cutting blade holder has a mounting face to which the seating face of the cutting blade is attached, a positioning reference side face with which the positioning side face of the cutting blade is contacted, and a fixing tapped hole provided in the mounting face with which a tip portion of the fixing screw passing through the through hole is screw-engaged. The mini plane can produce a specimen of a fixed thickness from a solid material for microscopic analysis.

10 Claims, 3 Drawing Sheets

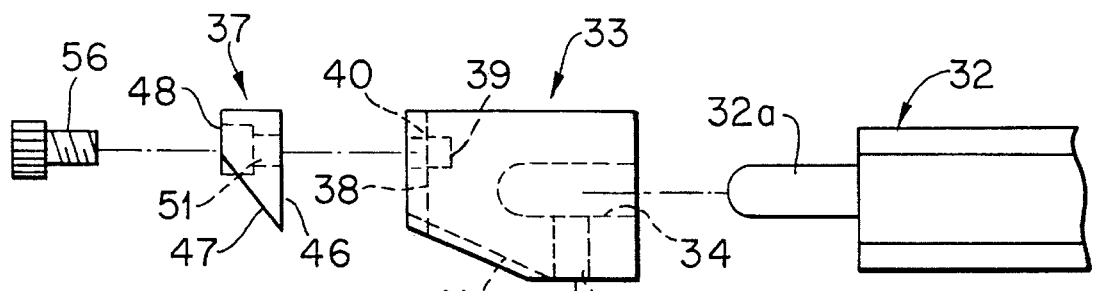
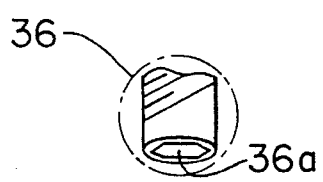
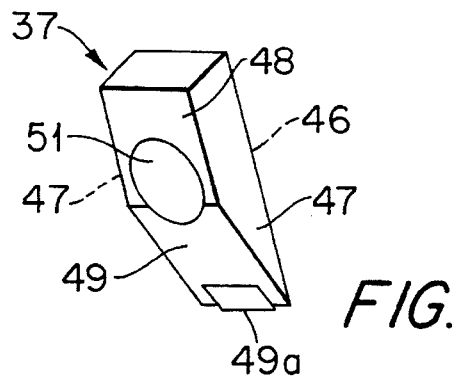
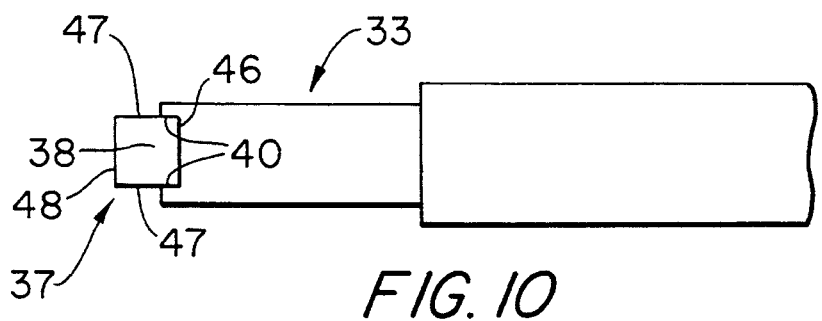
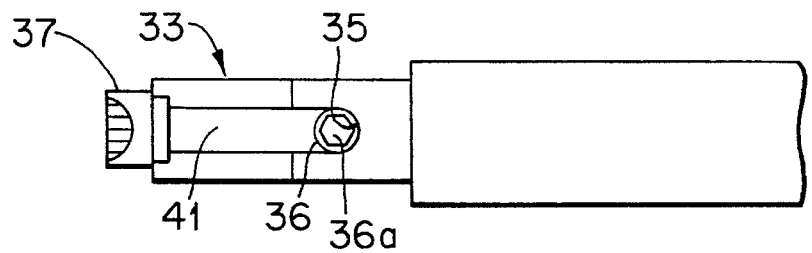

5,595,424

MINI PLANE

BACKGROUND OF THE INVENTION (a) Field of the Invention

The present invention relates to a mini plane (i.e. a small sized cutting tool) used for preparing a specimen for microscopic analysis.

The mini plane is used for obtaining a cutting for use as a specimen for microscopic analysis of solid materials such as metal, plastics, rubber and the like by thinly planing away the solid surface. By using diamond as a material for a cutting blade of the mini plane, it can easily plane hard solid materials such as stainless steel to prepare a specimen for microscopic analysis.

(b) Description of Related Art

According to a conventional method of preparing a specimen for microscopic analysis of solid materials, a knife is used to partially remove the surface of a solid material to obtain a specimen for microscopic analysis.

In the conventional method, it is difficult to obtain a specimen of a fixed thickness from a flat surface of a solid material for microscopic analysis. This problem is particularly remarkable when the solid material is hard.

SUMMARY OF THE INVENTION

In view of the foregoing problem, it is an object of the present invention to provide a mini plane which can easily plane away a specimen of a fixed thickness from a solid material for microscopic analysis.

To solve the problem, a mini plane according to the present invention comprises a bar-like handle capable of being held in a hand like a pencil, a cutting blade holder fixed on the bar-like handle at a forward end thereof, and a cutting blade detachably attached to the cutting blade holder. The cutting blade has a flat seating face, a front face opposite the seating face, a slant blade face which is slanted at a longitudinal end portion of the front face and whose tip edge agrees with a longitudinal edge of the seating face, a positioning side face perpendicular to a cutting edge of the slant blade face, and a through hole which extends between the seating face and the opposite front face and receives a fixing screw. The cutting blade holder has a mounting face to which the seating face of the cutting blade is attached, a positioning reference side face with which the positioning side face is contacted, and a fixing tapped hole provided in the mounting face with which a tip portion of the fixing screw passing through the through hole is screw-engaged. The cutting blade holder is provided with a surface for forming a cutting accommodating space which accommodates a cutting prepared by the cutting blade.

The mini plane according to the present invention can easily prepare a specimen with a fixed thickness for microscopic analysis from a solid material.

BRIEF DESCRIPTION OF THE DRAWINGS

The above and other objects, features and advantages of the present invention will be more apparent from the following description, referring to the accompanying drawings in which:

FIG. 2b is an enlarged portion of FIG. 2a;

FIG. 8a is a partly broken-away, exploded side view of the mini plane illustrated in FIG. 7, and FIG. 8b is an enlarged portion of FIG. 8a;

FIG. 9 is an enlarged perspective view of the cutting blade of the mini plane shown in FIG. 7;

FIG. 10 is an enlarged top view of the mini plane shown in FIG. 7, i.e. a view in the direction of arrow X in FIG. 7; and FIG. 11 is an enlarged bottom view of the mini plane shown in FIG. 7, i.e. a view in the direction of arrow XI in FIG. 7.

Figure 1:
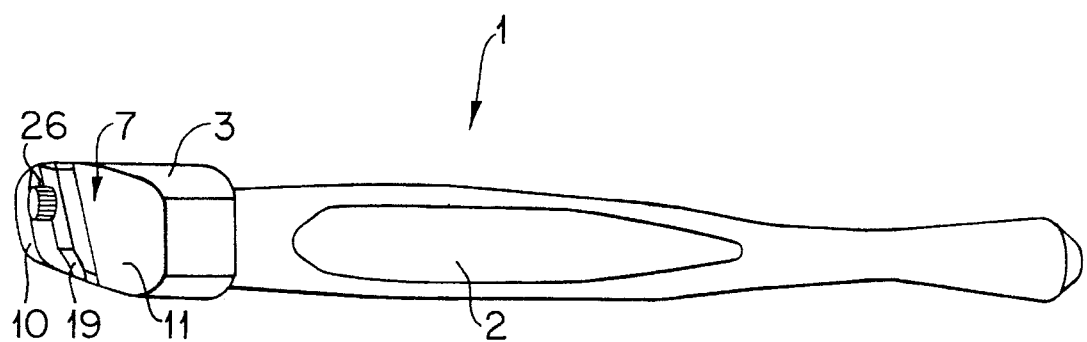
FIG. 1 is a perspective view of a mini plane according to a first embodiment of the present invention.

The aspects of the present invention are described as follows.

(1) A mini plane comprising:

a bar-like handle capable of being held in a hand like a pencil;

a cutting blade holder fixed on the bar-like handle at a forward end thereof; and a cutting blade detachably attached to the cutting blade holder;

wherein the cutting blade has a flat seating face, a front face opposite the seating face, a slant blade face which is slanted at a longitudinal end portion of the front face and whose tip edge agrees with a longitudinal edge of the seating face, a positioning side face perpendicular to a cutting edge of the slant blade face, and a through hole which extends between the seating face and the front face for receiving a fixing screw;

the cutting blade holder has a mounting face to which the seating face of the cutting blade is attached, a positioning reference side face with which the positioning side face is contacted, and a fixing tapped hole provided in the mounting face with which a tip end portion of the fixing screw passing through the through hole is screw-engaged; and the cutting blade holder is provided with a surface for forming a cutting accommodating space for accommodating a cutting produced by the cutting blade.

(2) A mini plane according to aspect (1), wherein a diameter of the through hole in the cutting blade is larger by a predetermined value than an outside diameter of the fixing screw, an adjusting tapped hole, which extends from a longitudinal end opposite the cutting edge of the cutting blade to the through hole, is formed in the cutting blade, and a position adjusting screw, which engages with the adjusting tapped hole with a tip end thereof reaching into the through hole, is provided.

(3) A mini plane according to aspect (2), wherein the positioning side face of the cutting blade is a side face formed perpendicular to the cutting edge of the cutting blade at one lateral end thereof.

(4) A mini plane according to aspect (3), wherein a width of the seating face of the cutting blade in a direction parallel to the cutting edge is greater than a width of the mounting face of the cutting blade holder, so that a lateral side portion of the cutting blade opposite the positioning side face projects from the mounting face, and the surface of the cutting blade holder for forming the cutting accommodating space is provided in correspondence with the side portion of the cutting blade projecting from the mounting face.

(5) A mini plane according to aspect (4), wherein a cutting edge portion of the cutting blade projecting from the mounting face is made of a superhard metal.

(6) A mini plane according to aspect (4), wherein a cutting edge portion of the cutting blade projecting from the mounting face is made of diamond.

Action of the present invention

The mini plane 1, 31 having the above-described features is used in such a manner that a bar-like handle 2, 32 to which a cutting blade holder 3, 33 is fixed at the forward end thereof is held by a user using his or her hand like a pencil.

When attaching the cutting blade 7, 37 to the cutting blade holder 3, 33, the seating face 16, 46 and the positioning side face 17, 47 of the cutting blade 7, 37 are brought in contact with the mounting face 8, 38 and the positioning reference side face 10, 40 of the cutting blade holder 3, 33, respectively. By bringing the positioning side face 17, 47 of the cutting blade 7, 37 into contact with the positioning reference side face 10, 40, the cutting blade 7, 37 is positioned with respect to the cutting blade holder 3, 33 in a direction parallel to the cutting edge.

In this state, the fixing screw 26, 56 is inserted into the through hole 21, 51 for the fixing screw, and the tip portion of the fixing screw 26, 56 is screwed into the fixing tapped hole 9, 39 of the cutting blade holder 3, 33 for fastening. With this operation, the cutting blade 7, 37 can be attached to the cutting blade holder 3, 33 at a predetermined position. Also, the cutting blade 7, 37 can be detached from the cutting blade holder 3, 33 by removing the fixing screw 26, 56. Accordingly, the cutting blade 7, 37 can be freely attached to and detached from the cutting blade holder 3, 33, thereby facilitating its replacement.

After attaching the cutting blade 7, 37 to the cutting blade holder 3, 33, the slant blade face 19, 49 is pressed against a surface of the solid material, and the cutting edge of the cutting blade 7, 37 is slid along the surface of the solid material to carve the surface of the solid material. The cutting T1 thus obtained is accommodated in the cutting accommodating space (a space in which the cutting T1 can exist) formed by the cutting accommodating space forming surface 11, 41 of the cutting blade holder 3, 33.

The cutting T1 is used as a specimen for microscopic analysis.

Action in the first aspect of the present invention:

In the mini plane 1 according to the first aspect of the present invention, the diameter of the through hole 21 of the cutting blade 7 is made larger by a predetermined value than the diameter of the fixing screw 26. Accordingly, in the state where a tip portion of the fixing screw 26 passing through the through hole 21 of the cutting blade 7 is loosely tightened in the fixing tapped hole 9 of the cutting blade holder 3 after the seating face 16 and the positioning side face 17 of the cutting blade 7 are brought in contact with the mounting face 8 and the positioning reference side face 10 of the cutting blade holder 3, respectively, the position of the cutting blade 7 is adjustable with respect to the cutting blade holder 3 due to the gap between the fixing screw 26 and the through hole 21 whose diameter is larger than that of the fixing screw 26.

In this state, the position adjusting screw 27 is screwed into the adjusting tapped hole 22 formed in the side surface of the cutting blade 7 opposite the cutting edge until its tip end is pressed against the peripheral surface of the fixing screw 26 in the through hole 21. This causes the cutting blade 7 to move opposite the cutting edge thereof for positional adjustment.

Action in the second aspect of the present invention:

In the mini plane 1 according to the second aspect of the present invention, since the positioning side face 17 of the cutting blade 7 is an outside face formed perpendicular to the cutting edge at one lateral end thereof, the outside face itself of the cutting blade 7 is used as the positioning side face 17. Accordingly, there is no need for preparing a separate positioning face.

Action in the third aspect of the present invention:

In the mini plane 1 according to the third aspect of the present invention, the width of the seating face 16 of the cutting blade 7 in a direction parallel to the cutting edge is made greater than the width of the mounting face 8 of the cutting blade holder 3, so that when the positioning side face 17 of the cutting blade 7 is brought in contact with the positioning reference side face 10 of the cutting blade holder 3, a side portion of the cutting blade 7 opposite the positioning side face 17 projects from the mounting face 8.

In the cutting blade holder 3, the surface 11 for forming the cutting accommodating space is provided in correspondence with the side portion of the cutting blade 7 projecting from the mounting face 8. Accordingly, the cutting T1 produced at the projecting side portion of the cutting blade 7 enters the cutting accommodating space.

Action in the fourth aspect of the present invention:

In the mini plane 1 according to the fourth aspect of the present invention, the cutting edge portion 19a of the cutting blade 7 which is projected from the mounting face 8 is made of a superhard metal. Hence, a solid material can be carved by the projected cutting edge portion 19a.

Action in the fifth aspect of the present invention:

In the mini plane 1 according to the fifth aspect of the present invention, the cutting edge portion 19a of the cutting blade 7 which is projected from the mounting face 8 is made of diamond. Hence, a solid material can be carved by the projected cutting edge portion 19a made of diamond, even in the case where the solid material is a hard material such as stainless steel.

DESCRIPTION OF THE PREFERRED EMBODIMENTS

Embodiments of the present invention will now be described in detail with reference to the drawings. The present invention is not to be limited to the following embodiments.

Figure 2B:
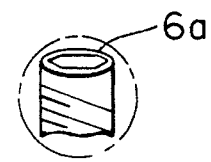
Figure 2A:
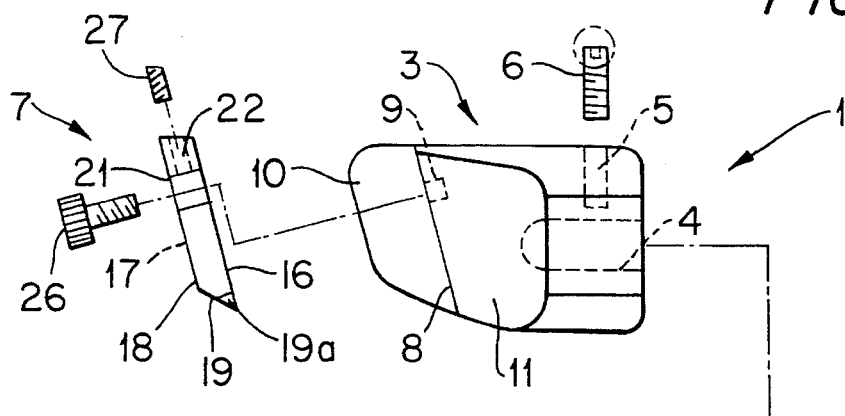
FIG. 2a is a partly broken-away, exploded side view of the mini plane illustrated in FIG. 1.
Figure 2A:
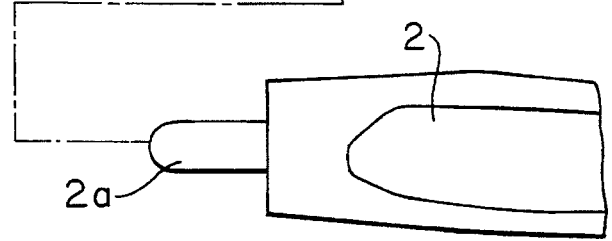
Figure 3:
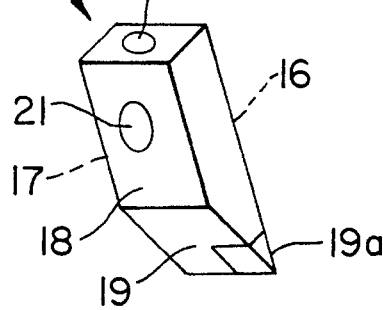
FIG. 3 is an enlarged perspective view of the cutting blade of the mini plane shown in FIG. 1.
Figure 4:
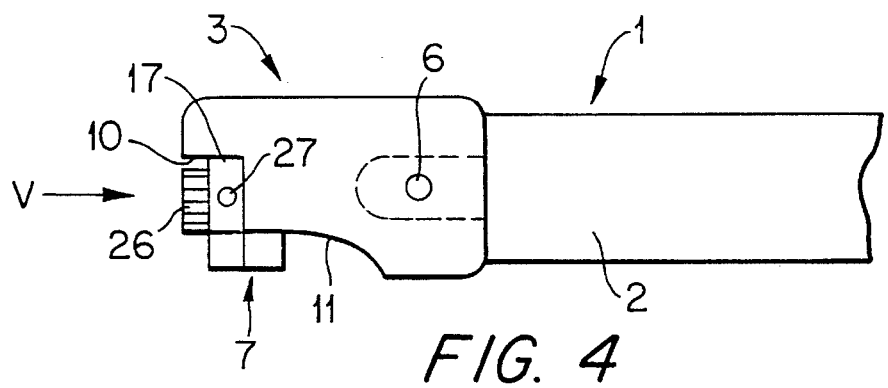
FIG. 4 is a top view of the mini plane shown in FIG. 1.
Figure 5:
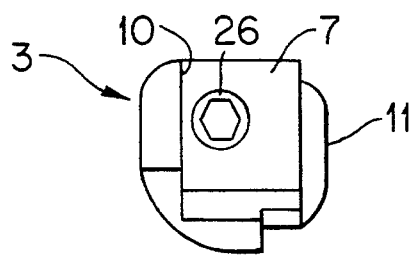
FIG. 5 is a view of the mini plane as viewed in the direction of arrow V in FIG. 4.
Figure 6:
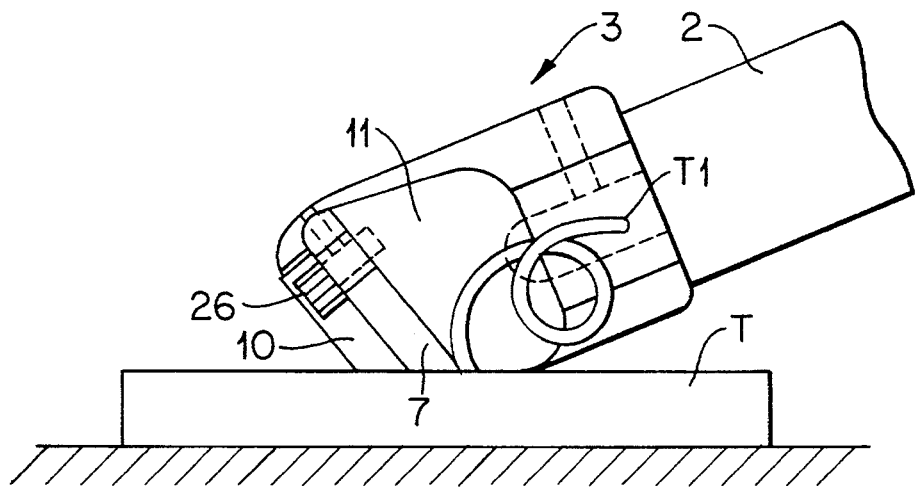
FIG. 6 is an illustration showing an action of the mini plane illustrated in FIG. 1.

First embodiment:

FIG. 1 is a perspective view of a mini plane according to a first embodiment of the present invention. FIGS. 2a and 2b together show an exploded side view of the mini plane according to the first embodiment. FIG. 3 is a perspective view of a cutting blade of the mini plane according to the first embodiment. FIG. 4 is a top view of the mini plane according to the first embodiment. FIG. 5 is a view of the mini plane in the direction of arrow V in FIG. 4. FIG. 6 is an illustration showing an action of the mini plane according to the first embodiment.

As shown in FIGS. 1–5, a mini plane 1 has a bar-like handle 2 capable of being held in a hand like a pencil. In the first embodiment, the bar-like handle 2 is made of wood, but it may be made of a plastic material.

As shown in FIG. 2a, the bar-like handle 2 is provided at its forward end thereof with a projection 2a having a small diameter. A cutting blade holder 3 includes a mating hole 4 into which the projection 2a of the bar-like handle 2 fits, and a fixing tapped hole 5 formed between the mating hole 4 and a top face of the cutting blade holder 3. A fixing screw 6 is screwed from outside into the fixing tapped hole 5 with its tip pressed against the projection 2a fit into the mating hole 4. A hexagonal socket 6a is formed in a head of the fixing screw 6 to allow a hexagonal wrench key to be fit thereinto for turning the fixing screw 6. By using such a fixing screw 6, the head of the fixing screw 6 will not project from the top face of the cutting blade holder 3. It is also possible to use an ordinary Phillips-head or standard head screw as the fixing screw 6.

The cutting blade holder 3 has a mounting face 8 to which a cutting blade 7, which will be described later, is detachably attached, a fixing tapped hole 9 formed in the mounting face 8, and a positioning reference side face 10 located at one lateral end of the mounting face 8. The positioning reference side face 10 has a function of positioning the cutting blade 7 in a direction perpendicular to the side face 10. The positioning reference side face 10 also has a function of preventing the cutting blade 7 from turning. This will be described later in the specification.

The cutting blade holder 3 is provided with a surface 11 for forming a cutting accommodating space which accommodates a cutting T1 (see FIG. 6) produced by the cutting blade 7.

As shown in FIG. 3, the cutting blade 7 to be detachably attached to the cutting blade holder 3 has a seating face 16 and a positioning side face 17 to come in contact with the mounting face 8 and the positioning reference side face 10, respectively, of the cutting blade holder 3. A slant blade face 19 is slanted at a longitudinal end portion of a front face 18 opposite the seating face 16 with its tip edge agreeing with a longitudinal edge of the seating face 16. The positioning side face 17 of the cutting blade 7 is a side face formed perpendicular to the tip edge of the slant blade face 19 (i.e. cutting edge) at one lateral end thereof.

Moreover, a through hole 21 for a fixing screw is formed between the seating face 16 and the front face 18. Also, in the cutting blade 7, an adjusting tapped hole 22 extends from a longitudinal end opposite the cutting edge to the through hole 21.

After the seating face 16 and the positioning side face 17 have been brought in contact with the mounting face 8 and the positioning reference side face 10 of the cutting blade holder 3, respectively, the cutting blade 7 is fixed on the cutting blade holder 3 using a fixing screw 26.

Since the positioning side face 17 of the cutting blade 7 is contacted with the positioning reference side face 10, the cutting blade 7 is prevented from turning about the fixing screw 26, so that the cutting blade 7 can be securely fixed on the cutting blade holder 3 with one fixing screw 26.

A diameter of the through hole 21 is made larger by a predetermined value than an outside diameter of the fixing screw 26, so that when a tip portion of the fixing screw 26 passing through the through hole 21 of the cutting blade 7 is loosely tightened in the fixing tapped hole 9 of the cutting blade holder 3, the position of the cutting blade 7 is adjustable with respect to the fixing screw 26. The position of the cutting blade 7 is adjusted along the positioning reference side face 10 of the cutting blade holder 3 by means of a position adjusting screw 27 screwed into the adjusting tapped hole 22. The functions of the fixing screw 26 and the position adjusting screw 27 will be described in detail later in the specification.

The width of the seating face 16 of the cutting blade 7 in a direction parallel to the cutting edge is made greater than the width of the mounting face 8 of the cutting blade holder 3, so that a side portion of the cutting blade 7 opposite the positioning side face 17 projects from the mounting face 8. The surface 11 for forming the cutting accommodating space is provided in correspondence with the side portion of the cutting blade 7 projecting from the mounting face 8.

A cutting edge portion 19a of the cutting blade 7 projecting from the mounting face 8 is made of a superhard metal. The cutting edge portion 19a can also be made of diamond in place of the superhard metal.

An action of the mini plane with the aforesaid features according to the first embodiment of the present invention will now be described.

A user holds, in his/her hand as if holding a pencil, the bar-like handle 2 of the mini plane 1 on which the cutting blade holder 3 is fixed at a forward end thereof.

When attaching the cutting blade 7 to the cutting blade holder 3, the seating surface 16 and the positioning side face 17 of the cutting blade 7 are brought in contact with the mounting face 8 and the positioning reference side face 10 of the cutting blade holder 3, respectively. By bringing the positioning side face 17 of the cutting blade 7 into contact with the positioning reference side face 10, the cutting blade 7 is positioned in a direction parallel to the cutting edge with respect to the cutting blade holder 3.

In the first embodiment, since the positioning side face 17 of the cutting blade 7 is a side face formed perpendicular to the cutting edge at one lateral end thereof, the side face itself of the cutting blade 7 is used as the positioning side face 17. Accordingly, there is no need for preparing a separate positioning face.

In the aforesaid state, the fixing screw 26 is inserted into the through hole 21 of the cutting blade 7, and then the tip end portion of the fixing screw 26 is at first loosely tightened into the fixing tapped hole 9 of the cutting blade holder 3. The diameter of the through hole 21 of the cutting blade 7 is made greater by a predetermined value than the outside diameter of the fixing screw 26. In the loosely tightened state, therefore, the clearance between the fixing screw 26 and the through hole 21 allows the cutting blade 27 to be adjusted in position with respect to the cutting blade holder 3.

In the aforesaid state, the position adjusting screw 27 is screwed into the adjusting tapped hole 22 formed in the rear longitudinal end of the cutting blade 7 opposite the cutting edge until its tip end is pressed against the peripheral surface of the fixing screw 26 in the through hole 21. This causes the cutting blade 7 to move opposite the cutting edge thereof for positional adjustment.

Thus, the cutting blade 7 is attached to the cutting blade holder 3 in a predetermined position. By removing the fixing screw 26, the cutting blade 7 can be detached from the cutting blade holder 3. Accordingly, the cutting blade 7 can be freely attached to and detached from the cutting blade holder 3, thereby facilitating its replacement.

The width of the seating face 16 of the cutting blade 7 in a direction parallel to the cutting edge is made greater than the width of the mounting face 8 of the cutting blade holder 3, so that when the positioning side face 17 of the cutting blade 7 is brought in contact with the positioning reference side face 10 of the cutting blade holder 3, a side portion of the cutting blade 7 opposite the positioning side face 17 projects from the mounting face 8.

In the cutting blade holder 3, the surface 11 for forming the cutting accommodating space is provided in correspondence with the side portion of the cutting blade 7 projecting from the mounting face 8. Accordingly, the cutting T1 (see FIG. 6) produced at the projecting side portion of the cutting blade 7 enters the cutting accommodating space. The cutting edge portion 19a of the cutting blade 7 is projected from the mounting face 8 and is made of a superhard metal. Hence, a solid material T can be carved by the projected cutting edge portion 19a.

As shown in FIG. 6, the slant blade face 19 of the cutting blade 7 attached to the cutting blade holder 3 is pressed against a surface of the solid material T, and the cutting edge of the cutting blade 7 is slid along the surface of the solid material T to carve the surface of the solid material T so that a cutting T1 is obtained. The cutting T1 is accommodated in the cutting accommodating space (a space in which the cutting T1 can exist) formed by the cutting accommodating space forming surface 11 of the cutting blade holder 3.

The cutting T1 is used as a specimen for microscopic analysis.

Figure 7:
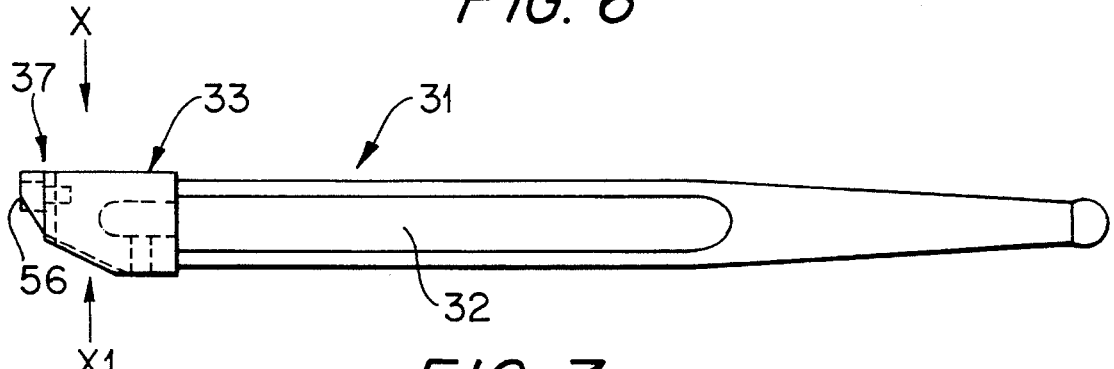
FIG. 7 is a side view of a mini plane according to a second embodiment of the present invention.

Second embodiment:

A mini plane according to a second embodiment of the present invention will now be described with reference to FIGS. 7–11. FIG. 7 is a side view of a mini plane according to the second embodiment of the present invention. FIGS. 8a and 8b together show is an enlarged, exploded side view of the mini plane according to the second embodiment. FIG. 9 is an enlarged perspective view of the cutting blade of the mini plane according to the second embodiment. FIG. 10 is an enlarged top view of the mini plane according to the second embodiment, i.e. a view in the direction of arrow X in FIG. 7. FIG. 11 is an enlarged bottom view of the mini plane according to the second embodiment, i.e. a view in the direction of arrow XI in FIG. 7.

As shown in FIGS. 7–11, a mini plane 31 has a bar-like handle 32 capable of being held in a hand like a pencil. In the second embodiment, the bar-like handle 32 is made of wood, but may be made of a plastic material.

As shown in FIGS. 7 and 8a–8b, the bar-like handle 32 is provided at a forward end thereof with a projection 32a having a small diameter. A cutting blade holder 33 includes a mating hole 34 into which the projection 32a of the bar-like handle 32 fits, and a fixing tapped hole 35 which extends between the mating hole 34 and a bottom face of the cutting blade holder 33. A fixing screw 36 is screwed into the fixing tapped hole 35 from underneath with its tip pressed against the projection 32a (see FIG. 8a) fit into the mating hole 34. A hexagonal socket 36a is formed in a head of the fixing screw 36 to allow a hexagonal wrench key to be fit thereinto for turning the screw.

The cutting blade holder 33 has a mounting face 38 to which a cutting blade 37, which will be described later, is detachably attached, a fixing tapped hole 39 formed in the mounting face 38, and positioning reference side faces 40 located at both lateral ends of the mounting face 38. The cutting blade holder 33 is provided with a surface 41 for forming a cutting accommodating space which accommodates a cutting produced by the cutting blade 37. As seen from FIGS. 8a–8b and 11, the surface 41 is slanted on a bottom surface of the cutting blade holder 33 at the forward end portion. A cutting accommodating space formed by the surface 41 is a groove with a rectangular section.

The cutting blade 37 to be detachably attached to the cutting blade holder 33 has a seating face 46 and positioning side faces 47 to come in contact with the mounting face 38 and the positioning reference side faces 40, respectively, of the cutting blade holder 33. A slant blade face 49 is slanted at an end portion (lower end portion) of a front face 48 opposite the seating face 46 with a longitudinal edge thereof (lower edge) agreeing with a longitudinal edge (lower edge) of the seating face 46. The positioning side faces 47 of the cutting blade 37 are side faces formed perpendicular to the tip edge of the slant blade face 49 (i.e. cutting edge) at both lateral ends thereof.

Moreover, a through hole 51 for a fixing screw is formed between the seating face 46 and the opposite front face 48 (see FIG. 9).

After the seating face 46 and the positioning side faces 47 have been brought in contact with the mounting face 38 and the positioning reference side faces 40 of the cutting blade holder 33, respectively, the cutting blade 37 is fixed on the cutting blade holder 33 using a fixing screw 56. Since the positioning side faces 47 of the cutting blade 37 are contacted with the positioning reference side faces 40, the cutting blade 37 is prevented from turning about the fixing screw 56, so that the cutting blade 37 can be securely fixed on the cutting blade holder 33 with one fixing screw 56.

The position of the cutting blade 37 is determined along the positioning reference side faces 40 of the cutting blade holder 33 by the position of the fixing tapped hole 39 in the cutting blade holder and the position of the through hole 51 in the cutting blade 37. Accordingly, these holes are manufactured at a high accuracy to attain a predetermined positional accuracy.

As shown in FIG. 9, a cutting edge portion 49a is located at a laterally central portion of the slant blade face 49 of the cutting blade 37 and is made of a superhard metal.

An action of the mini plane with the aforesaid features according to the second embodiment of the present invention will now be described.

A user holds the bar-like handle 32 of the mini plane 31 in his/her hand as if holding a pencil, in the same manner as for the first embodiment.

In the second embodiment, since the positioning side faces 47 of the cutting blade 37 are side faces formed perpendicular to the cutting edge at both lateral ends thereof, the side faces themselves of the cutting blade 37 are used as the positioning side faces 17. Accordingly, there is no need for preparing separate positioning faces.

Since the fixing screw 56 allows the cutting blade 37 to be detachably attached to the cutting blade holder 33, the cutting blade 37 can be replaced with ease.

The slant blade face 49 of the cutting blade 37 attached to the cutting blade holder 33 is pressed against a surface of a solid material, and the cutting edge of the cutting blade 37 is slid along the surface of the solid material to carve the surface of the solid material so that a cutting is obtained. The cutting is accommodated in a cutting accommodating space shaped in a groove with a rectangular section (a space in which the cutting can exist) formed by the surface 41 of the cutting blade holder 33.

The cutting is used as a specimen for microscopic analysis.

While preferred embodiments of the present invention have been described, the invention is not limited to the disclosed embodiments, but may be modified within the scope of the appended claims. Modified embodiments of the present invention are exemplified below.

Instead of using a side face of the cutting blade as a positioning side face of the cutting blade, a linear projection, a groove or the like may be provided to utilize a side face thereof as the positioning side.

As for a fixing screw to fix the cutting blade on the cutting blade holder, two such screws instead of one may be used.

What is claimed is:

1. A mini plane, comprising:

a bar-like handle;

a cutting blade holder fixed on said bar-like handle at a forward end thereof; and a cutting blade detachably attached to said cutting blade holder;

wherein said cutting blade has a flat seating face, a front face opposite the seating face, a slant blade face which is slanted at a longitudinal end portion of the front face and whose tip edge coincides with a longitudinal edge of said seating face, a positioning side face perpendicular to a cutting edge of the slant blade face, and a through hole which extends between said seating face and the front face for receiving a fixing screw;

said cutting blade holder has a mounting face to which the seating face of said cutting blade is attached, a positioning reference side face with which said positioning side face is contacted, and a fixing tapped hole provided in said mounting face with which a tip end portion of the fixing screw passing through said through hole is screw-engaged;

said cutting blade holder is provided with a surface for forming a cutting accommodating space for accommodating a cutting produced by said cutting blade;

a diameter of the through hole in said cutting blade is larger by a predetermined value than an outside diameter of said fixing screw;

said cutting blade has an adjusting tapped hole which extends from a longitudinal end opposite the cutting edge of said cutting blade to the through hole; and wherein said mini plane further comprises a position adjusting screw which engages with said adjusting tapped hole with a tip end thereof reaching into said through hole.

2. A mini plane according to claim 1, wherein said positioning side face of said cutting blade is a side face formed perpendicular to the cutting edge of the cutting blade at one lateral end thereof.

3. A mini plane according to claim 2, wherein a cutting edge portion of said cutting blade projecting from said mounting face is made of a superhard metal.

4. A mini plane according to claim 2, wherein a cutting edge portion of said cutting blade projecting from said mounting face is made of diamond.

5. A mini plane according to claim 2, wherein a width of the seating face of said cutting blade in a direction parallel to the cutting edge is greater than a width of the mounting face of said cutting blade holder, so that a lateral side portion of the cutting blade opposite said positioning side face projects from the mounting face, and said surface of said cutting blade holder for forming said cutting accommodating space is provided in correspondence with the side portion of the cutting blade projecting from the mounting face.

6. A mini plane according to claim 5, wherein a cutting edge portion of said cutting blade projecting from said mounting face is made of a superhard metal.

7. A mini plane according to claim 5, wherein a cutting edge portion of said cutting blade projecting from said mounting face is made of diamond.

8. A mini plane according to claim 1, wherein a cutting edge portion of said cutting blade projecting from said mounting face is made of a superhard metal.

9. A mini plane according to claim 1, wherein a cutting edge portion of said cutting blade projecting from said mounting face is made of diamond.

10. A mini plane according to claim 1, wherein a width of the seating face of said cutting blade in a direction parallel to the cutting edge is greater than a width of the mounting face of said cutting blade holder, so that a lateral side portion of the cutting blade opposite said positioning side face projects from the mounting face, and said surface of said cutting blade holder for forming said cutting accommodating space is provided in correspondence with the side portion of the cutting blade projecting from the mounting face.

* * * * *